US006875368B2

(12) United States Patent
John et al.

(10) Patent No.: US 6,875,368 B2
(45) **Date of Patent: *Apr. 5, 2005**

(54) MAGNETORHEOLOGICAL FLUID COMPOSITION AND A PROCESS FOR PREPARATION THEREOF

(75) Inventors: Reji John, Kochi (IN); Narayana Das Janardhanan Pillai, Kochi (IN)

(73) Assignee: The Adviser Defence Research and Development Organisation, Ministry of Defence, Government of India, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 10/433,087

(22) PCT Filed: Oct. 3, 2001

(86) PCT No.: PCT/IN01/00167

§ 371 (c)(1),
(2), (4) Date: May 30, 2003

(87) PCT Pub. No.: WO02/45102

PCT Pub. Date: Jun. 6, 2002

(65) Prior Publication Data

US 2004/0021126 A1 Feb. 5, 2004

(51) Int. Cl.[7] .................................................. C04B 35/00
(52) U.S. Cl. .................................. 252/62.52; 252/62.55
(58) Field of Search ............................ 252/62.52, 62.55

(56) References Cited

U.S. PATENT DOCUMENTS 4,992,190 A 2/1991 Shtarkman
5,354,488 A 10/1994 Shtarkman et al.
5,578,238 A 11/1996 Weiss et al.
6,027,664 A 2/2000 Weiss et al.
6,743,371 B2 * 6/2004 John et al. ............... 252/62.52

* cited by examiner

*Primary Examiner*—C. Melissa Koslow
(74) *Attorney, Agent, or Firm*—Venable LLP; Catherine M. Voorhees

(57) ABSTRACT

The present invention relates to a magnetorheological fluid composition and a process for preparing the same, which has excellent magnetorheological properties. The fluid composition exhibits change in rheological characteristics in the presence of an external magnetic field. Further, the magnetorheological characteristics of the fluid composition can be optimised for the improved magnetic sensitivity to external magnetic field and negligible magnetic retentivity after removal of the external magnetic field. The sensitivity of the fluid to external magnetic field can be varied by varying the pure iron content of the magnetic sensitive particles composition while, the magnetic retentivity of the fluid (after removal of external magnetic field) can be varied by varying the ferrite alloy content of the same. The fluid composition utilises a magnetic sensitive particles stabiliser or surfactant, which is synthesised from the carrier fluid used in the fluid composition. The fluid composition, prepared according to this process, does not suffer from the rapid settling of the magnetic particles as it utilises a carrier fluid based surfactant, which improves the homogeneity of the fluid composition.

10 Claims, No Drawings

MAGNETORHEOLOGICAL FLUID COMPOSITION AND A PROCESS FOR PREPARATION THEREOF

FIELD OF INVENTION

This invention relates to magnetorheological fluid composition and a process for preparation thereof.

PRIOR ART

A magnetorheological fluid comprises a uniform dispersion of magnetic responsive particles in a fluid carrier medium dispersed with the aid of surfactants. These fluids change their flow or Theological characteristics in a very short time under the influence of an external magnetic field and these fluids find applications in electromechanical actuators, wherein these fluids act as an interface between a sensing device and a required mechanical output device. In case of automotive applications, these fluids are utilised in shock absorbers, vibration dampers etc. These fluids also find applications in devices such as rotary seals, bearings and other related devices. However, these magnetorheological fluids must have a high degree of stability in order to be applicable.

Generally, a stable magnetic fluid in a high magnetic field gradient requires small sits magnetic responsive particles having diameter less than 1000 A°. These magnetic responsive particles are coated with layers of surfactants. Each particle has a constant magnetic dipole moment proportional to its size that can align with the applied external magnetic field. Surfactants are employed to enhance the homogeneity of the resultant magnetorheological fluid composition In the absence of surfactant coatings, the magnetic responsive particles have tendency to quickly settle inside the carrier fluid due to large difference in the density of such particles and the carrier fluid The magnetic responsive particles, employed, could be iron oxide, iron, iron carbide, low carbon steel or alloys of zinc, nickel, manganese or cobalt etc. Similarly, the carrier fluids could be hydrocarbon oils, paraffin, mineral oils, polyester and phosphate esters etc. Additionally, certain additives like antioxidants or anti-wear agents are also employed in the fluid compositions. The carrier fluid should be preferably non-volatile, non-inflammable, non-toxic and stable over a wide range of operating temperature.

In the absence of magnetic field, the magnetorheological fluid has a measurable viscosity, which depends upon several parameters like shear rate, temperature etc. however, in presence of an external magnetic field, the viscosity of the fluid increases to a very high value as the suspended particles align themselves resulting in rapid physical gelling of the fluid. The viscosity changes closely follow the bingham plastics behavior, wherein the yield stress in a function of the strength of the applied magnetic field. The magnetic field force induces alignment of the otherwise random dispersion of magnetic sensitive particles of the fluid into chain like structures offering increased resistance to flow, which is responsible for the build up of "yield strength". On removal of magnetic field the structure crumbles and fluidity of the material returns to is original value. An ideal magnetorheological fluid composition should be highly sensitive to the applied magnetic field but at the same time it should return back to its original condition of fluidity as soon as the external magnetic field is removed.

The magnetorheological fluid compositions and their applications are well known to the prior art. However, the magnetorheological fluid compositions, know in the prior art, suffer from following disadvantages.

Main disadvantage of the known magnetorheological fluid compositions is that these magnetorheological fluid compositions are not optimised for desirable combination of contradicting properties viz improved magnetic sensitivity in the presence of external magnetic field and least magnetic retentivity after removal of the external magnetic field.

Another disadvantage of the know magnetorheological fluid compositions is that these fluids suffer from rapid settling of magnetic responsive particles as these fluids employ surfactants generically different from carrier fluids employed and thereby adversely affecting the settling resistance of the magnetic responsive particles due to their gravity difference with the carrier fluid.

Still another disadvantage of the known magnetorheological fluid compositions is that these fluid compositions generally employ hydrocarbon and mineral oils as carrier fluids, which are obtained through complex processes.

Yet further disadvantage of the known magnetorheological fluid compositions is that these fluid compositions employ carrier fluids which are not available from renewable sources.

Still further disadvantage of the known magnetorheological fluid compositions is that the process for preparing these fluid compositions is complex

OBJECTS OF THE INVENTION

Primary object of the invention is to provide a magnetorheological fluid composition and a process for preparing the same wherein the magnetorheological fluid has excellent magnetorheological properties.

Another object of the invention is to provide a magnetorheological fluid composition and a process for preparing the same wherein the Brookfield viscosity of the magnetorheological fluid can be changed continuously over a wide range, typically from 500 CP to 120000 CP and beyond by varying the strength of magnetic field.

Yet another object of the invention is to provide a magnetorheological fluid composition and a process for preparing the same wherein the magnetorheological fluid has optimised combination of high magnetic sensitivity in the presence of external magnetic field and low magnetic retentivity after removal of the external magnetic field.

Still another object of the invention is to provide a magnetorheological fluid composition and a process for preparing the same wherein the sensitivity of the magnetorheological fluid to the external field can be varied by varying the weight percentage of pure iron particles content and magnetic retentivity can be varied by varying the weight percentage of ferrite alloys content.

Yet another object of the invention is to provide a magnetorheological fluid composition and a process for preparing the same, wherein the magnetorheological fluid does not suffer from the rapid settling of the magnetic responsive particles as it utilises a carrier fluid based surfactant thereby improving the homogeneity of the fluid composition.

Still another object of the invention is to provide a magnetorheological fluid composition and a process for the preparing the same wherein the magnetorheological fluid utilises a vegetable oil extracted from an agro-seed as a carrier fluid.

Still further object of the invention is to provide a magnetorheological fluid composition and a process for the preparation of the same wherein the magnetorheological fluid does not utilise additives like organomolybdenum, thiophosphorus, thiocarbamate, alkyl amines etc.

Yet further object of the invention is to provide a magnetorheological fluid composition and a process for preparing the same wherein the magnetorheological fluid is insensitive to the normal level of contamination.

Still further object of the invention is to provide a magnetorheological fluid composition and a process for preparing the same wherein the magnetorheological fluid has low hysteresis characteristics.

Yet further object of the invention is to provide a magnetorheological fluid composition and a process for preparing the same wherein the magnetorheological fluid can be used for wide temperature range from −10° C. to +80° C.

Yet another object of the invention is to provide a magnetorheological fluid composition and a process for preparing the same wherein the magnetorheological fluid utilises a carrier fluid which is easily available.

Still further object of the invention is to provide a magnetorheological fluid composition and a process for preparing the same wherein the magnetorheological fluid utilises a carrier fluid which depends upon renewable source of supply.

Yet further object of the invention is to provide a magnetorheological fluid composition and a process for preparing the same wherein the magnetorheological fluid utilises a carrier fluid which is eco-friendly.

Still further object of the invention is to provide a magnetorheological fluid composition and a process for preparing the same wherein the magnetorheological fluid has improved stability.

Yet further object of the invention is to provide a magnetorheological fluid composition and a process for preparing the same wherein the process of preparation is very simple.

Still another object of the invention is to provide a magnetorheological fluid composition and a process for preparing the same wherein the viscosity of the magnetorheological fluid can be continuously changed with the application of the magnetic field.

Still further object of the invention is to provide a magnetorheological fluid and a process for preparing the same wherein the magnetorheological fluid can be utilised for marking controllable devices and adaptive structures, such as dampers, mounts etc and rotary devices like clutches, brakes, valves etc.

DESCRIPTION OF THE INVENTION

According to this invention there is provided the proposed magnetorheological fluid utilises castor oil, a derivative of vegetable oil extracted from agro-seed as a carrier fluid This carrier fluid i.e. castor oil is cheaper, easily available, eco-friendly, biocompatible and has renewable source of supply Further, this carrier fluid does not require additives like thiophosphorus, thiocarbamate and amines. The magnetorheological fluid composition comprises magnetic responsive particles such as iron and its alloys, all know iron oxides, iron nitride, iron carbide, carbonyl. The proposed process for preparation of die magnetorheological fluid is simpler and does not need complex machinery. The Brookfield viscosity of the magnetic fluid can be continuously varied over a wide range from 500 CP to 120000 CP and beyond under the influence of external magnetic field. However, viscosity of the magnetorheological fluid composition depends on the viscosity of the cancer fluid employed therein.

DETAILED DESCRIPTION OF THE PROCESS

According to the present invention, the process for the preparation of the magnetorheological fluid composition comprises of following steps.

(i) Preparation of Magnetic Sensitive Particles 80 to 95% by weight of commercially available high purity iron particles such as carbonyl iron and 5 to 20% by weight of commercially available ferrite alloys such as nickel-Zinc ferrite or manganese zinc ferrite are dry blended using a powder blender.

(i) Preparation of Magnetic Sensitive Particles Stabiliser (Surfactant)

90 to 98% by weight of castor oil of commercial purity (viscosity about 700–800 Cps) and 1 to 5% by weight of con. Sulphuric acid (assay 98%) is mixed by pouring sulphuric acid to the castor oil in a container, drop wise under continuous stirring. The temperature is maintained between 25 to 30° C. using a water bath. The mix is further allowed to react for two hours with the temperature maintained between 25–30° C. Next, 1 to 5% by weight of 20% aqueous solution of potassium hydroxide (potassium hydroxide pellets≧85% purity, dissolved in distilled water) is added drop wise to this mix under continuous stirring with temperature maintained between 25 to 30° C. This mix is further allowed to react for two more hours at the same temperature, The magnetic sensitive particle stabiliser, thus obtained, is finally washed with distilled water till the water pH becomes neutral.

(ii) Coating of Magnetic Sensitive Particles Obtained from step (i) with the Magnetic Sensitive Particles Stabiliser Obtained from Step (ii)

90 to 90% by weight of the magnetic sensitive particle, obtained through step (i), is mixed with 1 to 10% of particle stabiliser, obtained through step (ii) using a laboratory kneader. However, before mixing, the magnetic sensitive particle drop wise to the magnetic sensitive particles and mixed in a kneader. The mix, thus obtained is allowed to mature for 24 hours at room temperature.

(ii) Synthesis of Magnetorheological Fluid Composition 80 to 90% by weight of modified magnetic sensitive particles, obtained through step (iii), are mixed with 10 to 20% by weight of commercially available low viscosity castor oil. Before mixing, the castor oil is preheated to about 60–70° C. in a container and the modified magnetic sensitive particles are added to it in a gradual fashion.

Once these particles are added to the oil, the mix is homogenised using a high speed mixer in different stages. In the beginning, the mixing speed of the mixer is increased from about 500 to 1000 rpm within first 10 minutes of mixing and mixing is continued for about 1 hour. Subsequently, the homogenised mixed is cooled to room temperature. In the next stage, the mix is further agitated at a high rpm of 2000 to 3000 for about 3 to 5 minutes and is allowed to cool to the room temperature. The above agitation at 3000 rpm is repeated once again to obtain the final product i.e.

The invention will now be illustrated with working examples, which are typical examples to illustrate the working of the invention and are not intended to be taken restrictively to imply any limitation on the scope of the present invention.

WORKING EXAMPLE-I 76.50 gm of high purity iron powder and 8.50 gm of nickel-zinc ferrite are dry blended in a powder blender. The magnetic sensitive particles, prepared in this manner, are stored separately for subsequent modification with stabiliser.

Next, 2.40 gm of castor oil of commercial purity is mixed with 0.050 gm of concentrated sulfuric acid in a container while maintaining the temperature to 30° C. using a water bath. Further, this mix is allowed to react for 2 hours at the same temperature. In the next step, 0.050 gm of potassium hydroxide is dissolved in 2.50 ml distilled water in a container. This aqueous solution of potassium hydroxide is added to the mix prepared in earlier step drop wise under continuous stirring while maintaining the temperature to the same level. This entire mix is further allowed to react for two more hours. This mix is finally washed with distilled water till the pH of the water becomes neutral. This product is utilised to modify the magnetic sensitive particles using a laboratory kneader. The resulting modified magnetic sensitive particles are allowed to mature for 24 hours. Next, 12.50 gm of mono ester derivative of commercially available low viscosity castor oil is taken in a container and heated to 70° C. The coated magnetic sensitive particles, obtained from above step, are added to the hot castor oil and is mixed using a high speed mixer. The mixing speed is increased from 500 rpm to 1000 rpm and mixture is allowed to cool down to room temperature. The mixture is further agitated at high speed of 3000 rpm for 3–5 minutes and subsequently, it is allowed to cool down to the room temperature. The above homogenisation cycle is again repeated to obtain 100 gm magnetorheological fluid.

WORKING EXAMPLE-II 73.0 gm of high purity iron powder and 9.0 gm of manganese-zinc ferrite are dry blended in a powder blender. Next 4.40 gm of castor oil of commercial purity is mixed with 0.050 gm of concentrated sulfuric acid in a container while maintaining the temperature to 30° C. using a water bath. Further, this mix is allowed to react for 2 hours at the same temperature. In the next step, 0.050 gm of potassium hydroxide is dissolved in 2.50 ml distilled water in a container. The above aqueous solution of potassium hydroxide is add to mix prepared in earlier step drop wise under continuous stirring while maintaining the temperature to the same level. The entire mix is further allowed to react for two more hours. This mix is washed with distilled water till the pH of the water becomes neutral. This product is utilised to wet the dry blended powder using a laboratory kneader. The resulting mix is allowed to mature for 24 hours. Next, 13.50 gm of commercially available castor oil is taken in a container and heated at 70° C. The mix is added to the hot castor oil and is thoroughly mix using a high-speed mixer. The mixing speed is increased from 500 rpm to 1000 and mixture is allowed to cool down to room temperature. The mixture is further agitated at high speed of 3000 rpm for 5 minutes and subsequently, it is allowed to cool down to the room temperature. The above homogenising cycle is again repeated to obtain 100 gm magnetorheological fluid.

It is to be understood that the process of the present invention is susceptible to adaptations, changes and modifications by those skilled in the art. Such adaptations, changes and modifications are intended to be within the scope of the present invention, which is further set forth with the following claims.

We claim:

1. A magnetorheological fluid composition comprising:

(a) 10–20% by weight of castor oil as a carrier fluid; and (b) 80–90% by weight of magnetic sensitive particles coated with magnetic sensitive particles stabiliser and dispersed in the said carrier fluid wherein the said magnetic sensitive particles stabiliser is synthesised from the said carrier fluid and comprises 90–98% by weight of said carrier fluid, 1–5% by weight of conc. sulphuric acid (assay 98%) and 1–5% by weight of aqueous solution of potassium hydroxide.

2. A magnetorheological fluid composition as claimed in claim 1, wherein the said magnetic sensitive particles comprises 80–95% by weight of high purity iron particles and 5–20% by weight of ferrite alloys.

3. A process for the preparation of magnetorheological fluid composition having castor oil as a carrier fluid and magnetic sensitive particles coated with the magnetic sensitive particles stabiliser the said process comprising the steps of:

(i) preparing magnetic sensitive particles by dry blending 80–95% by weight of high purity ion particles such as carbonyl iron and 5–20% by weight of ferrite alloys;

(ii) preparing magnetic sensitive particles stabiliser comprising the steps of adding 1–5% by weight of concentrated sulphuric acid drop wise to 90–98% by weight of the said carrier fluid in a container under continuous stirring and allowing them to react for about 2 hours with temperature maintained at about 25–30° C. adding 1–5% by weight of an aqueous solution of potassium hydroxide to the reaction product of sulphuric acid and carrier fluid under continuous stirring allowing the entire mix to react for about two hours with the temperature maintained at about 25–30° C., washing the magnetic sensitive particles stabiliser;

(iii) coating the said magnetic sensitive particles obtained from step (i) with the said magnetic particles stabiliser prepared in step (ii) by heating 1–10% of the said particle stabiliser to 60–80° C. adding it drop wise to 90–99% by weight of the said magnetic sensitive particles, mixing both with a laboratory kneader and allowing the coated particles, thus obtained in the form of putty, to mature for about 24 hours at room temperature;

(iv) synthesising magnetorheological fluid composition comprising the steps of heating 10–20% by weight of the said carrier fluid as used in step (iii) to 60–80° C. in a container, adding 80–90% by weight of the said coated magnetic sensitive particles obtained from step (iii) to it, homogenising the mix thus obtained, in a high speed mixer and agitating the said mix followed by cooling it to the room temperature, further agitating the said mix and finally cooling the magnetorheological fluid composition, thus obtained, to room temperature.

4. A process for the preparation of magnetorheological fluid composition having castor oil as a carrier fluid and magnetic sensitive particles coated with the magnetic sensitive particles stabiliser dispersed in the said carrier fluid wherein the said magnetic particles stabiliser is synthesised from the same carrier fluid which is used to disperse the said coated magnetic sensitive particles.

5. A magnetorheological fluid composition as claimed in claim 2, wherein the said high purity iron particles comprise carbonyl iron particles.

6. A magnetorheological fluid composition as claimed in claim 2, wherein the said ferrite alloy includes nickel zinc ferrite.

7. A magnetorheological fluid composition as claimed in claim 2, wherein the said ferrite alloy includes manganese zinc ferrite.

8. A process for the preparation of magnetorheological fluid composition as claimed in claim 3, wherein the said high purity iron particles comprise carbonyl iron particles.

9. A process for the preparation of magnetorheological fluid composition as claimed in claim 3, wherein the said ferrite alloy includes manganese zinc ferrite.

10. A process for the preparation of magnetorheological fluid composition as claimed in claim 3, wherein the said ferrite alloy includes nickel zinc ferrite.

* * * * *